United States Patent [19]

Roli

[11] 4,132,418
[45] Jan. 2, 1979

[54] SEAL WITH A COMPENSATING THRUST RING

[75] Inventor: Lino Roli, Modena, Italy
[73] Assignee: Italtractor I.T.M. S.p.A., Modena, Italy
[21] Appl. No.: 898,431
[22] Filed: Apr. 20, 1978

[30] Foreign Application Priority Data

May 11, 1977 [IT] Italy .............................. 40052 A/77

[51] Int. Cl.² ........................ B62D 55/00; F16J 15/38
[52] U.S. Cl. ........................................ 277/91; 277/84; 277/92; 277/95; 277/96.1; 305/11
[58] Field of Search ................... 277/81 R, 84, 85, 91, 277/92, 95, 96 R, 96.1, 152, 165, 166; 305/11-12

[56] References Cited

U.S. PATENT DOCUMENTS

| | | | |
|---|---|---|---|
| 2,881,015 | 4/1959 | Wahl | 277/96 X |
| 3,275,334 | 9/1966 | Voitik | 277/84 X |
| 3,336,086 | 8/1967 | Reinsma | 277/95 X |
| 3,838,862 | 10/1974 | Fern | 277/96.1 |
| 3,841,718 | 10/1974 | Reinsma | 305/11 |
| 3,905,607 | 9/1975 | Maguire et al. | 277/96.1 X |

FOREIGN PATENT DOCUMENTS

1045390  6/1953  France .................................. 277/81 R

Primary Examiner—Robert S. Ward, Jr.
Attorney, Agent, or Firm—Browdy and Neimark

[57] ABSTRACT

Disclosed herein is a seal with a compensating thrust ring which is able to exercise an efficient sealing action between the opposite flat surfaces of two members of an articulation spaced axially one from the other and subjected to undergoing, in addition to relative rotation around a common axis, minor relative axial displacements.

The seal in question consists essentially of a sealing ring made of material highly resistant to wear, and a compensating thrust ring with high elastic deformation characteristics, positioned so that it is pressed into contact with the two walls of a cylindrical housing provided in the flat surface of the first of the two articulation members.

The front of the sealing ring is provided with an edge designed to seal onto the flat surface of the second member, while the back is profiled to form a particular convex surface in contact with the compensating ring and under the thrust action thereof.

The said convex surface is designed so that the compensating ring can exercise a sufficiently constant thrust on the sealing ring in an axial direction, to suit the variations in the distance between the opposite flat surfaces of the two members.

6 Claims, 3 Drawing Figures

4,132,418

SEAL WITH A COMPENSATING THRUST RING

BACKGROUND OF THE INVENTION

This invention relates to a seal with a compensating thrust ring which can be gainfully used to seal the joints of articulations between mechanical parts subjected to relative motion under the most varied operating conditions.

It is, in particular, able to exercise an efficient sealing action between two opposite flat surfaces belonging to two members of an articulation spaced axially one from the other and subjected to undergoing relative rotation around a common axis.

Specifically, but not exclusively, the seal forming the subject of the invention is utilized for the links in tracked vehicles of the type in which the coupling surface between the journal and the pin in the articulation between one link and the other is lubricated by means of lubricating oil enclosed in a cavity inside the pin.

The function of the seal in question is that of impeding or, at any rate, of limiting to the full, the lubricating oil from leaking out of the end of the journal.

DESCRIPTION OF THE PRIOR ART

Because of the stress to which the track is subjected under its normal conditions of employment, besides relative rotation, very rapid displacements take place in a prevalently axial direction, between the said journal and its corresponding pin, thereby creating rapidly variable conditions of play between the opposite surfaces in between which the sealing action has to be exercised.

SUMMARY OF THE INVENTION

The main object of the present invention is to create a seal with a compensating ring which, when used between a first and a second flat surface belonging to a first and to a second member spaced axially and in rotation around a common axis, respectively, is able to effect a constant, efficient, seal and to compensate for and to promptly suit itself to fast relative displacements between the said surfaces over a wide temperature variability field.

One advantage offered by the present invention is that for a long period of time it is possible for the articulation to be kept in a good state of lubrication which not only ensures its life span being considerable but makes for smoother and notably less noisy operation.

The foregoing and other advantages too are attained with the present invention, which acts as a seal between a first and a second flat surface belonging to a first and a second member, respectively, spaced axially and in relative rotation around a common axis, the first member having a cylindrical housing comprising the first flat surface opposite which there is the second flat surface, essential features of the seal being that it comprises:

a sealing ring made of material highly resistant to wear, of a maximum axial length less than the distance between the said opposite surfaces, and having a rigid internal reinforcing member; the said sealing ring comprising: a front edge whose radial section forms an angle, the vertex of which acts as a thin sealing ring in contact with the second flat surface, and a convex surface turned towards the said axis, this turned towards the cylindrical surface of the housing and having an inclination which initially is practically nil but which increases progressively as the distance away from the said front edge gets greater in such a way that the points of the said surface get gradually closer to the said axis, as the said distance gets greater;

a compensating thrust ring with high elastic deformation characteristics, designed to fit between the first flat surface and the cylindrical surface of the housing and to be coaxially placed in contact with the aforementioned convex surface of the sealing ring, the dimensions of the thrust ring, the sealing ring and the housing, as well as the distance the said two opposite surfaces are apart, being reciprocally correlated in such a way that the thrust ring can be compressed both in an axial and in a radial direction in order to provide the sealing ring with the required thrust in an axial direction against the second flat surface.

BRIEF DESCRIPTION OF THE DRAWINGS

Further characteristics and advantages of the seal forming the subject of the present invention will emerge more clearly from the following description of a preferred but not the sole form of embodiment, which is illustrated purely as an unlimited example on the accompanying drawings, in which.

DESCRIPTION OF THE PREFERRED EMBODIMENTS

Figure 1:
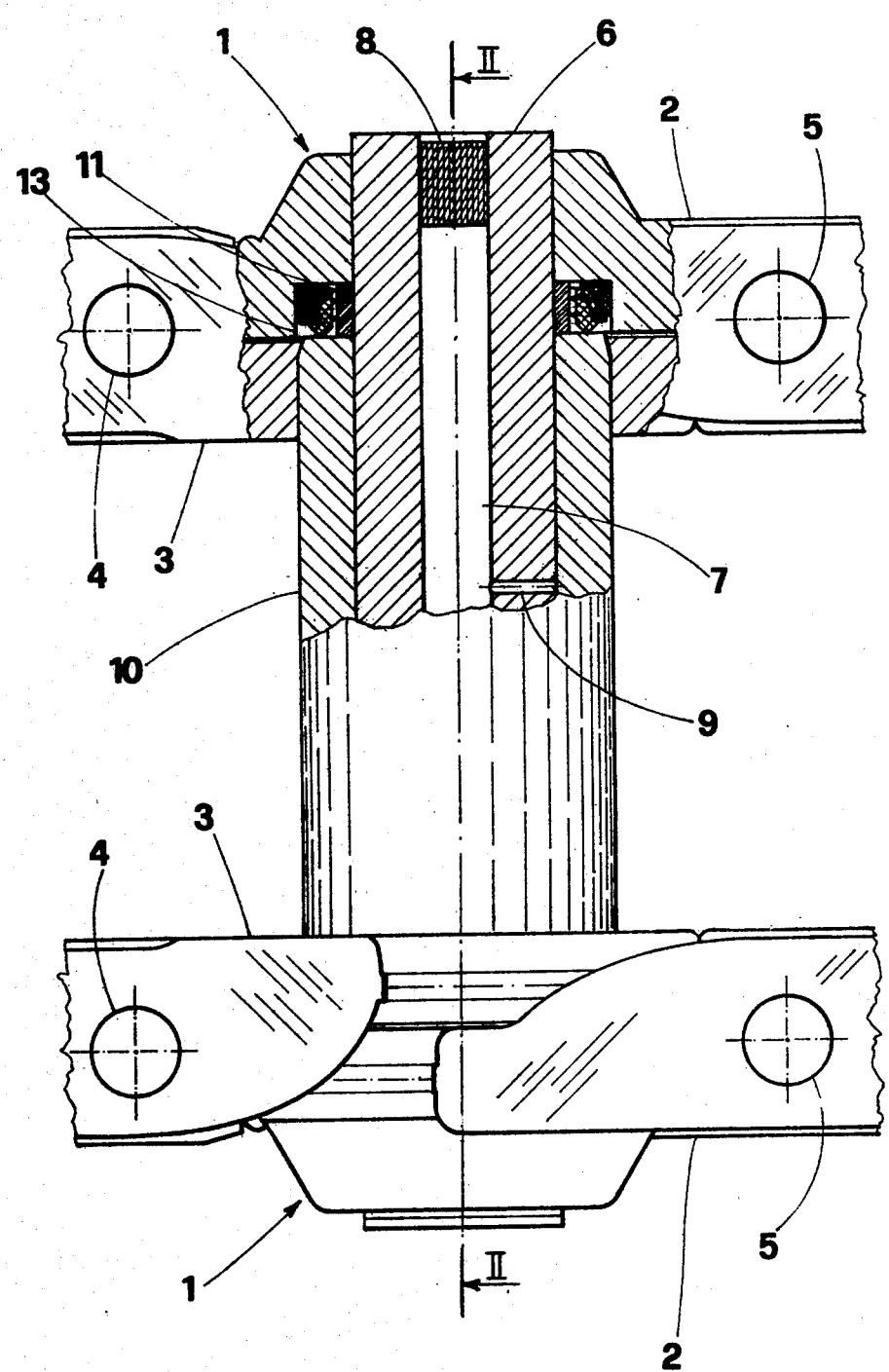
FIG. 1 shows, in a plan view partially in sectional form, a track articulation in which a seal with a compensating ring according to the present invention is incorporated.

With reference to the above mentioned figures, shown globally at (1) there is a joint in an articulation in the belt constituting one track of a tracked vehicle.

The said joint comprises a first member (2) and a second member (3) constituted by two cleats, the extremity of one being opposite that of the other, which are connected in a way thereby they are free to undergo a relative rotation around a command axis.

The track shoes are connected to the cleats (2) and (3) through bolts passing through the holes (4) and (5).

The cleat (2) is located on the outside with respect to the complete set of links forming the track and is stably keyed onto the extremity of a pin (6).

The said pin (6) is hollow and it has internally a coaxial dead hole (7), the open extremity of which is sealed with an impermeable plug (8).

In the said pin (6) there are the through holes (9) which are positioned radially so as to place the hole (7) in communication with the outside.

The cleat (3) is located internally with respect to the complete set of links forming the track and it is coupled to one extremity of the external cylindrical surface of a journal (10). The said coupling is such that the cleat (3) is placed coaxially on the pin (6) and is movable rotatably with respect to this.

At a point corresponding to each extremity of the journal (10), the cleat (2) has a cylindrical housing (13) comprising a flat surface (2a) perpendicular to the axis of the pin (6). The said surface (2a) is opposite and spaced axially with respect to a second flat surface (10a) on the extremity of the journal (10), the superficies of which has a high degree of finish.

The two surfaces (2a) and (10a), respectively, are kept apart by a spacer (11) made of sintered steel, which is self lubricated, hardened and tempered in the area of the lateral faces thereof which come into contact with the surfaces (2a) and (10a).

The surfaces of the said spacer (11) that come into contact with the surfaces (2a) and (10a), respectively, are provided with the radial slots (12), the function of which is to place the cylindrical housing (13) in communication with the hollow space in between the external surface of the pin (6) and the internal surface of the spacer (11). The relative motion occurs preferably between the surfaces in contact of the spacer (11) and the journal (10).

Placed inside the housing (13) is the seal (14) with the compensated thrust ring (15) forming the subject of the present invention, and this performs a sealing function between the surfaces (10a) and (2a).

The sealing ring (14) is made of a material which is highly resistant to wear and has self-lubricating properties, and its axial length is less than that of the said spacer (11). On the front of said sealing ring (14) there is an edge whose radial section forms an angle, the vertex of which acts as a thin sealing ring in contact with the flat surface (10a), and on the outside it has a convex surface (17) which turns around its own axis of symmetry, turned towards the cylindrical surface of the housing (13).

Figure 3:
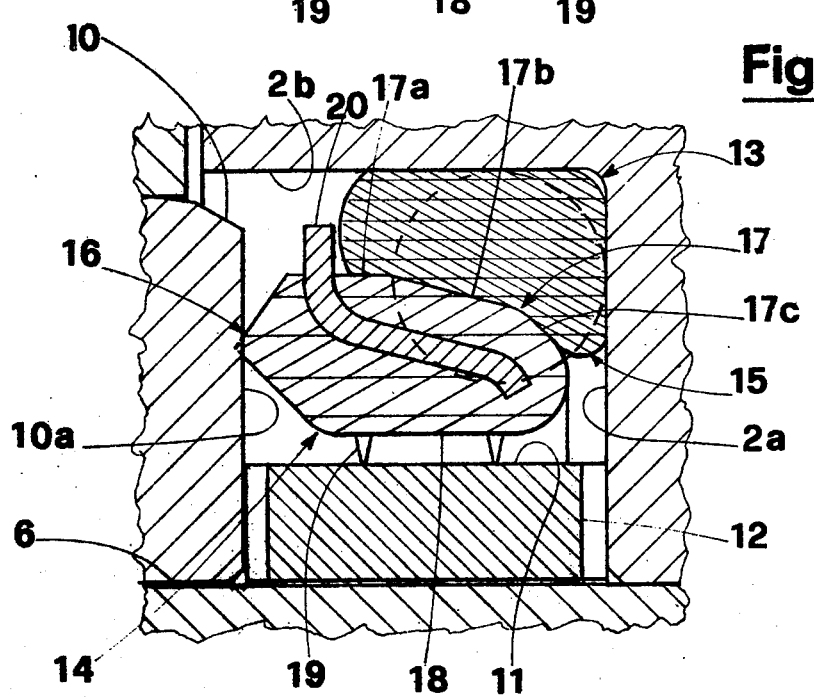
FIG. 3 shows, in the same way as in FIG. 2, a second form of embodiment for the invention in question.

In the second form of embodiment depicted in FIG. 3, the conformation of the front edge (16) is varied so as to decrease the radial volume of the sealing ring (14).

The said convex surface (17) is constituted by a number of surfaces that turn around one and the same axis, these all being radiused with respect to one another, the first of these, (17a), being closest to the front edge (16) and cylindrical is shape, whilst the others, (17b) and (17c), respectively, follow on consecutively in the order stated, and are of truncated cone shape with a taper that becomes gradually more and more pronounced as their distance away from the said front edge increases.

Furthermore, the sealing ring (14) has an internal edge constituted by a circular cylindrical surface (18), suitably radiused both to the front edge (16) and to the truncated cone shaped revolution surface (17c). The said circular cylindrical surface (18) is provided with a number of extension pieces (19) of constant shape and height, which are arranged over two parallel circumferences.

The said extension pieces (19) are spaced out at regular intervals over each of the two circumferences, and the free ends thereof determine an internal, coaxial, circular cylindrical surface for centering and guiding the said sealing ring (14) onto the external cylindrical surface of the spacer (11).

The sealing ring (14) has an internal metal reinforcing member (20) constituted by a thin annular metal plate of radial section shaped so that it is able to follow, with a certain approximation, the profile of the convex surface (17).

The said metal reinforcing member (20) is partially included in the material used to create the sealing ring (14) and is firmly bonded thereto.

The compensating thrust ring (15) is of a circular section and is positioned in the housing (13) in contact with the external cylindrical surface (2b) of this and with the surface (2a). Furthermore, it is placed coaxially in contact with part of the convex surface (17).

The said ring (15) has high elastic deformation characteristics and does not compress easily. The dimensions of the ring (15) and of the housing (13), as also the distance between the surfaces (10a) and (2a) are reciprocally correlated in such a way that, after assembly, the ring (15) is, under working conditions, deformed and compressed in both an axial and a radial direction between the convex surface (17) and the surfaces (2a) and (2b).

Figure 2:
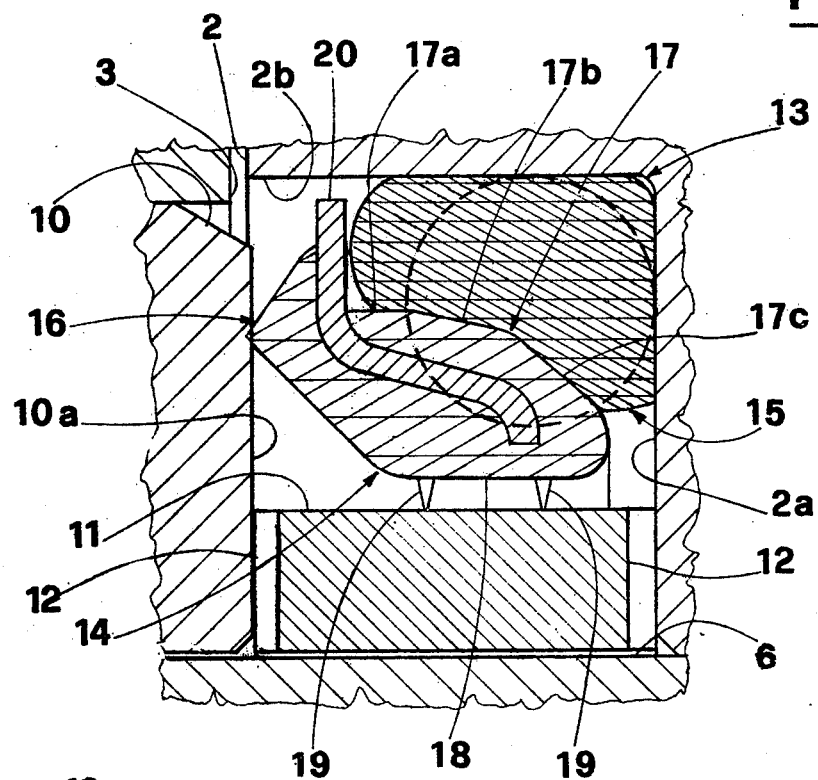
FIG. 2 shows, in an enlarged scale, a section along the path (II)—(II) of a part of FIG. 1, comprising a first form of embodiment for the invention in question.

In FIGS. 2 and 3, the outline of the section of the ring (15) is shown with dashes in its non-deformed condition.

The deformed ring (15) presses on a part of the surface (17) and provides the sealing ring (14) with a thrust in an axial direction whereby the front edge (16) is kept in pressed contact with the flat surface (10a). The value of the said thrust is determined to suit various factors, and of these, principally the geometrical conformation of the edge (16) and the deformation possibility of the material used for the ring (14), the purpose of this being to establish optimum values in respect of the height of the edge sealed against the surface (10a) in order to achieve a high and prolonged resistance to wear and a satisfactory sealing ability.

In the condition described, the seal is effected between the two opposite surfaces, (10a) and (2a), respectively, through the contact and thrust on these exercised by the front edge (16) and by the deformed surface of the ring (15), respectively, the latter being purposely made of a synthetic elastomer particularly resistant to lubricating oils.

Under the normal, onerous, conditions of employment to which each articulation in a track is subjected, situations of play are produced which, for example when changing from forward to reverse motion, create prevalently axial relative displacements between the surfaces (10a) and (2a) and sudden variations in the distance one is apart from the other. These variations in distance must be compensated by a prompt response on the part of the thrust ring so that the sealing ring be pressed constantly against the surface (10a) with thrust values as close as possible to the said optimum value. This is achieved with the seal according to the invention since as the distance increases, the thrust ring (15) tends to abandon part of its elastic deformation in order to approach the non-deformed configuration shown with dashes in FIGS. 2 and 3, and to exert a thrust onto the sealing ring (14), the axial component of which pushes the front edge (16) against the surface (10a). In this regards, the particular conformation of the convex surface (17) onto which the thrust is exerted allows the axial component of the thrust to undergo, within certain limits, the least possible variation to suit the variation in the distance between the surfaces (10a) and (2a). In fact, when changing from the maximum distance achievable between the said two surfaces (10a) and (2a) to the minimum distance, the ring 15 deforms progressively and this essentially affects, first of all, the surface (17c), then by degrees the surface (17b) progressively, and finally, the surface (17a).

The axial thrust component produced on the surface (17c) is greater than on the surface (17b) and is nil on the surface (17a), and thus the increase in the deformation of the ring (15) is largely compensated for by a progressive decrease in the contribution of the axial component concerned. Furthermore, the ring (15) is free to deform inside the housing (13) and its thrust onto the surface (17a) does not give rise to any axial component. The limited variation in the axial thrust as the distance between the two surfaces (2a) and (10a) changes makes it possible to notably limit the wear on the front sealing edge (16) and on the surface (10a).

The excellent elastic deformation characteristics of the thrust ring (15) over a wide temperature variability field make a prompt response possible to compensate for rapid variations in the axial distance between the two surfaces (2a) and (10a). Contrarily, it is advisable for the sealing ring (14) to have minimum deformation possibilities both in a radial direction, to resist radial thrust produced by the thrust ring (15), and in each section so that the edge sealed against the surface (10a) is always optimum. Hence the reason why, as described earlier on, provision is made for the metal reinforcing member (20) which is integral with the material used for the sealing ring (14). The latter offers the advantage, furthermore, that as the distance varies between the surfaces (2a) and (10a), the thin sealing edge does not undergo displacements in a radial direction on the surface (10a) (this naturally limits wear on the ring), thanks mainly to the particular conformation of the said ring and to the fact that it is not easily deformable.

The task of the extension pieces (19) is to center the sealing ring (14) on the spacer, this being to facilitate the assembly operation; subsequently, however, when the track is in use, this function ceases to exist.

The section of the thrust ring (15) is preferably circular, and this simplifies the manufacture of the rings and makes them readily available on the market.

The seal according to the invention can obviously undergo numerous modifications of a practical-constructional nature and, by way of an exammple, the surface (17) can have, along any section, a curved profile embodying the functional principles described herein, just as, for example, the section of the thrust ring (15) does not have to be circular, without in any way deviating from the framework of protection afforded to the invention through the claims appended hereunder.

What is claimed is:
1. A seal with a compensating thrust ring that acts as a seal between a first and a second flat surface belonging to a first and to a second member, respectively, spaced axially and in rotation around a common axis, the said first member having a cylindrical housing comprising the first flat surface opposite which the second flat surface is located, essential features of the ring being that it comprises:
   a sealing ring made of material highly resistant to wear, of a maximum axial length less than the distance between the said opposite surfaces, and having a rigid internal reinforcing member; the said sealing ring comprising: a front edge whose radial section forms an angle, the vertex of which acts as a thin sealing ring in contact with the second flat surface, and a convex surface to turn around the said axis, this turned towards the cylindrical surface of the housing and having an inclination which initially is practically nil but which increases progressively as the distance away from the said front edge gets greater in such a way that the points of the said surface get gradually closer to the said axis, as the said distance gets greater;
   a compensating thrust ring with high elastic deformation characteristics, designed to fit between the first flat surface and the cylindrical surface of the housing and to be coaxially placed in contact with the aforementioned convex surface of the sealing ring, the dimensions of the thrust ring, the sealing ring and the housing, as well as the distance the said two opposite surfaces are apart, being reciprocally correlated in such a way that the thrust ring can be compressed both in an axial and in a radial direction in order to provide the sealing ring with the required thrust in an axial direction against the second flat surface.

2. A seal according to claim 1, wherein the said compensating thrust ring has a circular section and is made of an elastomer which does not compress easily and is particularly resistant to lubricating oils.

3. A seal according to claim 1, wherein the said convex revolution surface is constituted by a number of surfaces that turn around the same axis, radiused one with respect to the other, the surface closest to the front sealing edge of the said sealing ring being cylindrical, whilst the others of truncated cone shape follow on consecutively one after the other with a taper angle that becomes gradually more and more pronounced as their distance away from the said front edge increases.

4. A seal according to claim 1, wherein the said internal reinforcing member is constituted by a rigid annular plate, the shape of which is such that it is able to follow approximately the profile of the said convex revolution surface, partially included in and firmly bonded to the highly resistant to wear material in the inside of the said sealing ring.

5. A seal according to claim 1, wherein the said sealing ring is provided with an internal edge constituted by a circular cylindrical surface, radiused to the said front edge and to the said convex revolution surface, and having a plurality of extension pieces of constant shape and height, which are arranged radially over at least one circumference and are spaced away one from the other so as to encompass with their free ends, the cylindrical surface of the spacer for centering and guiding the said sealing ring.

6. A seal according to claim 1, wherein the wear resistant material used for the said sealing ring has self-lubricating properties.

* * * * *